United States Patent [19]

Courtis et al.

[11] Patent Number: 4,746,705
[45] Date of Patent: May 24, 1988

[54] VINYL CHLORIDE POLYMER COMPOSITION CONTAINING (METH)ACRYLATE-ALPHA METHYL STYRENE COPOLYMER

[75] Inventors: Andrew Courtis, Frodsham, England; Marcel B. Elser, Sins, Switzerland

[73] Assignee: Imperial Chemical Industries PLC, London, England

[21] Appl. No.: 839,175

[22] Filed: Mar. 12, 1986

[30] Foreign Application Priority Data

Mar. 15, 1985 [GB] United Kingdom ............... 8506787

[51] Int. Cl.$^4$ ................ C08F 14/06; C08F 14/08; C08F 265/04
[52] U.S. Cl. .................. 525/308; 525/227; 525/239; 525/317; 524/529; 524/523; 524/527
[58] Field of Search ...................... 525/308, 317

[56] References Cited

U.S. PATENT DOCUMENTS 3,891,723 6/1975 Nicolet et al. .................. 525/308
4,048,260 9/1977 Haaf et al. ..................... 525/308

FOREIGN PATENT DOCUMENTS 803598 1/1969 Canada .
1081659 3/1960 Fed. Rep. of Germany .
0031513 2/1985 Japan ................................ 525/317
981116 1/1965 United Kingdom .
1482973 8/1977 United Kingdom .
1530854 11/1978 United Kingdom .
1543774 4/1979 United Kingdom .

*Primary Examiner*—Wilbert J. Briggs, Sr.
*Attorney, Agent, or Firm*—Cushman, Darby & Cushman

[57] ABSTRACT

Vinyl chloride polymer (PVC) composition especially suitable for calendering which comprises PVC, at least one copolymer of an alkyl (meth)acrylate (preferably n-butyl acrylate) and alpha methyl styrene of low molecular weight (10,000 to 100,000) achieved by performing the copolymerization in the presence of a chain transfer agent, particularly cyclohexene, and which composition optionally contains a processing aid, and wherein the PVC and said at least one alkyl (meth)acrylate copolymer are admixed by performing the VC polymerization process to produce the PVC in the presence of the alkyl (meth)acrylate copolymer.

25 Claims, No Drawings

VINYL CHLORIDE POLYMER COMPOSITION CONTAINING (METH)ACRYLATE-ALPHA METHYL STYRENE COPOLYMER

The present invention relates to a vinyl chloride polymer composition and to a process for making such a composition.

An important outlet for rigid or semi-rigid vinyl chloride polymers is in the production of transparent film using a calendering process. For such an application, the polymeric material used must possess or provide a number of characteristics, such as good non-stick behaviour during calendering, good gelation, high melt strength, high transparency in the calendered film, and good thermal stability. In particular, it is well known that industrial scale calendering of vinyl chloride polymers tends to suffer from the problem of the polymeric material sticking to the calender bowl, thereby causing a troublesome processing operation.

Various ways of mitigating the sticking problem have been proposed wherein the vinyl chloride polymer is used in conjunction with an acrylic or methacrylic alkyl ester of one sort or another.

For example, poly(n-butyl acrylate) homopolymer has been incorporated into the vinyl chloride polymer either by mixing the two polymers or by polymerising the vinyl chloride (and any comonomers) used in the presence of the acrylate polymer (see GB-PS 1 530 854 for the latter process). However, the use of acrylic alkyl ester homopolymer in our experience does not entirely alleviate the problem of calender-bowl sticking, especially when operating on an industrial scale. Also, we have found that the thermal stability (and sometimes the transparency) of the modified polymer may not be as good as might be desired.

Belgian No. 824 116 discloses the production of a non-stick vinyl chloride polymer by polymerising vinyl chloride in the presence of a low viscosity copolymer of an alkyl acrylate with acrylonitrile and/or acrylamide. Because of their toxicity, special precautions must be taken when handling comonomers such as acrylonitrile and acrylamide.

DE-PS No. 1 081 659 discloses the addition of copolymers of acrylic acid esters and N-vinyllactams to vinyl chloride polymers to provide non-stick polymers. However, the thermal stability of the modified vinyl chloride polymers is adversely affected.

It is therefore apparent that all the above proposals for the provision of modified vinyl chloride polymers suitable for non-stick calendering have one drawback or another.

We have now discovered a new vinyl chloride polymer composition not having the above-mentioned drawbacks and having an excellent balance of properties for calendering purposes.

According to the present invention there is provided a vinyl chloride polymer composition comprising a mixture of a vinyl chloride polymer and at least one alkyl (meth)acrylate copolymer, wherein the admixture of said vinyl chloride polymer and said at least one alkyl (meth)acrylate copolymer has been effected by polymerisation in aqueous suspension of the monomer(s) to form said vinyl chloride polymer in the presence of 0.1 to 20 weight % (based on the weight of monomer(s) used for the vinyl chloride polymerisation) of said at least one alkyl (meth)acrylate copolymer, and wherein said alkyl (meth)acrylate copolymer is a copolymer formed from the copolymerisation of at least one alkyl (meth)acrylate of 2 to 8 carbon atoms in the alkyl group with 1 to 50% by weight (based on the weight of alkyl (meth)acrylate charged) of alpha methyl styrene and 0 to 30 % by weight (based on the weight of alkyl (meth)acrylate charged) of one or more other copolymerisable monomers, and has a molecular weight within the range of from 10,000 to 100,000.

(The term (meth)acrylate represents acrylate or methacrylate).

There is further provided according to the invention a process for the production of a vinyl chloride polymer composition comprising forming a mixture of a vinyl chloride polymer and at least one alkyl (meth)acrylate copolymer, wherein in said process the admixture of said vinyl chloride polymer and said at least one alkyl (meth)acrylate copolymer is effected by polymerisation in aqueous suspension of the monomer(s) to form said vinyl chloride polymer in the presence of 0.1 to 20 weight % (based on the weight of monomer(s) used for the vinyl chloride polymerisation) of said at least one alkyl (meth)acrylate copolymer, and wherein the said alkyl (meth)acrylate copolymer used is a copolymer formed from the copolymerisation of at least one alkyl (meth)acrylate of 2 to 8 carbon atoms in the alkyl group with 1 to 50 % by weight (based on the weight of alkyl (meth)acrylate charged) of alpha methyl styrene and 0 to 30 % by weight (based on the weight of alkyl (meth)acrylate charged) of one or more other copolymerisable monomers, and has a molecular weight within the range of from 10,000 to 100,000.

The vinyl chloride polymer composition of the present invention possesses excellent non-stick behaviour, good gelation, high melt strength, high transparency, excellent thermal stability and good solvent resistance.

The alkyl (meth)acrylate copolymer used in the invention may be made by copolymerisation of the constituent monomers thereof in a conventional copolymerisation process, with bulk, solution and emulsion polymerisation being preferred—particularly bulk polymerisation as it is essential that the resulting copolymer must be substantially free of any residual alpha methyl styrene (which tends to retard vinyl chloride polymerisation processes) and a bulk phase reaction product is well suited for use in a high temperature stripping operation for the effective removal of any residual alpha methyl styrene. Any suitable free radical-yielding initiator or combination of initiators may be used, e.g. the conventional peroxides or azo compounds such as di(tert butyl) peroxide, tert butyl perpivalate and azo diisobutyronitrile. A combination of di(tert)butyl peroxide and tert butyl perpivalate is convenient and effective for polymerisation in bulk. Any suitable polymerisation temperature may be used, e.g. 50° to 150° C.

Examples of alkyl (meth)acrylates which may be used for the alkyl (meth)acrylate copolymer include ethyl acrylate, n-propyl acrylate, n-butyl acrylate, n-pentyl acrylate, n-hexyl acrylate, 2-ethylhexyl acrylate, ethyl methacrylate, n-butyl methacrylate and 2-ethylhexyl methacrylate, with n-butyl acrylate being particularly preferred.

The use of alpha methyl styrene in the alkyl (meth)acrylate copolymer is critical and cannot e.g be replaced by styrene or methyl methacrylate since the resulting vinyl chloride polymer composition yields calendered film of unacceptable haziness. The preferred level of alpha methyl styrene to use in the copolymerisation is from 5 to 40% by weight, more preferably 5 to 30 weight %, based on the weight of alkyl (meth)acrylate charged.

The molecular weight of the alkyl (meth)acrylate copolymer, by which is meant the weight average molecular weight, which may be conveniently determined from viscosity measurements or gel permeation chromatography, should be within the range of from 10,000 to 100,000, preferably 25,000 to 75,000. The use of copolymer with molecular weight below 10,000 tends to yield a vinyl chloride polymer composition which provides calendered film that is too hazy and in any case has poor non-stick behaviour, while the use of material with molecular weight above 100,000 tends to have a deleterious effect on the granulation in the vinyl chloride polymerisation in that an extremely coarse (and hence unacceptable) product is obtained. The attainment of such a relatively low molecular weight (of 10,000 to 100,00) is conveniently achieved by conducting the polymerisation to form the alkyl (meth)acrylate copolymer in the presence of an appropriate amount of a suitable chain transfer agent. Examples of chain transfer agents may be selected from mercaptans (e.g. alkane thiols), aldehydes, hydrocarbons, chlorohydrocarbons and certain olefines. We find the use of cyclohexene as chain transfer agent is very convenient since it is easily handleable, is a liquid (and so very suitable for use in a bulk phase polymerisation) and is easily and effectively removed by stripping after the polymerisation. Our experience thus far indicates that the best level of cyclohexene to use is 1 to 20 weight %, preferably 5 to 15 weight %, based on the weight of alkyl (meth)acrylate charged; the use of less than 1 weight % tends to yield an intractable material having too high a molecular weight while the use of more than 20 weight % results in too low a molecular weight.

The alkyl (meth)acrylate copolymerisation may optionally be performed in the presence of up to 30 weight % (based on the weight of alkyl (meth)acrylate charged) of one or more other copolymerisable comonomers, preferably 0 to 20 weight %, and more preferably 0 to 10 weight %. Examples of suitable other comonomers include vinyl esters, vinyl ethers, vinyl chloride and vinylidene chloride. If such a comonomer is employed it should not of course be one which adversely affects the properties of the resulting vinyl chloride polymer composition. Strictly speaking, cyclohexene could possibly be considered as an example of a copolymerisable comonomer since it may to a very small extent become incorporated in the alkyl (meth)acrylate copolymer. For practical purposes however, it is not considered as such since its units will only become incorporated at a level of perhaps about up to 1 weight % in the copolymer, and for the most part it behaves as a true chain transfer agent.

The alkyl (meth)acrylate copolymer, prior to the use thereof in the vinyl chloride polymerisation, should be treated to substantially remove any potential inhibitor (particularly residual alpha methyl styrene) for the subsequent vinyl chloride polymerisation. This may conveniently be effected by using a high temperature stripping operation.

A particulaly preferred alkyl (meth)acrylate copolymer for use in the invention is a copolymer made by copolymerising in a bulk phase process n-butyl acrylate and 10 to 20 weight % based on the n-butyl acrylate charged (e.g. about 13 to 15 weight %) of alpha methyl styrene in the presence of 10 to 15 weight % based on the n-butyl acrylate charged (e.g. about 10 weight %) of cyclohexene using a reaction temperature of 130° to 140° C. The initiator system may conveniently be a mixture of the initiators di(tert butyl) peroxide and tert butyl perpivalate. The resulting product, which must be thoroughly stirred during stripping to remove residual alpha methyl styrene, is a relatively mobile syrup.

The amount of alkyl (meth)acrylate copolymer used in the vinyl chloride polymerisation should be 0.1 to 20 weight % (based on the weight of monomer(s) charged for the vinyl chloride polymerisation), preferably 0.5 to 5 weight %. The use of less than 0.1 weight % provides no significant improvement in the non-stick behaviour of the resulting composition, while the use of more than 20 weight % tends to yield a composition with unacceptable plate-out behaviour and unacceptably lowered softening point. The alkyl (meth)acrylate may be charged to the vinyl chloride polymerisation reactor in any suitable form, e.g. in bulk, dissolved in a solvent, or as an aqueous dispersion or emulsion.

The admixture of the vinyl chloride polymer and the alkyl (meth)acrylate copolymer is effected by polymerisation in aqueous suspension of the monomer or monomers to form the vinyl chloride polymer in the presence of the preformed alkyl (meth)acrylate copolymer. The copolymer is preferably present at or before the start of polymerisation but may be added during the course of the polymerisation (although usually before about 50 % conversion). Merely mixing preformed vinyl chloride polymer and alkyl (meth)acrylate copolymer does not appear to be properly effective since the resulting material tends to yield hazy calendered film.

The polymerisation to form the vinyl chloride polymer in the presence of the alkyl (meth)acrylate copolymer is carried out in aqueous suspension in an otherwise conventional manner using a suspension agent system and a free-radical yielding monomer-soluble initiator or combination of initiators.

The suspension agent employed in the vinyl chloride polymerisation process is normally one or more of those used generally for the polymerisation of vinyl chloride in aqueous suspension. Examples of these include protective colloids such as partially hydrolysed polyvinyl acetate, gelatin, polyvinyl pyrrolidone, and cellulose derivatives, e.g. methyl cellulose, carboxymethyl cellulose and hydroxyethyl cellulose. Other additives, for example surfactants such as sorbitan esters may also be included as part of the suspension agent system if desired to promote properties such as increased porosity. The suspension agent may be used in a conventional quantity -generally speaking from 0.01 to 1% by weight calculated on monomer weight.

Any suitable free-radical yielding polymerisation initiator (or combination of initiators) that is monomer-soluble may be used in the vinyl chloride polymerisation process. Examples of these include peroxy compounds such as di-tertiarybutyl peroxide, acyl peroxides such as lauroyl peroxide and acetyl cyclohexyl sulphonyl peroxide, peresters such as tertiarybutyl peroctoate, percarbonates and azo compounds such as azo-bis-isobutyronitrile and 2,2'-azo-bis-2,4-dimethyl-valeronitrile. Monomer-soluble free-radical yielding polymerisation initiators that are particularly suitable for use in the vinyl chloride polymerisation process are the dialkyl or dicycloalkyl peroxydi-carbonates whose alkyl or cycloalkyl radicals contain up to 20 carbon atoms, such as diethyl peroxydi-carbonate, di-isopropyl peroxydicarbonate, dicetyl peroxydicarbonate, and di(- tertiarybutyl cyclohexyl) peroxydicarbonate, and azo compounds such as 2,2'n-azo-bis-2,4-dimethyl-valeronitrile and azo-bisisobutyro-nitrile. The initiator(s) may be used in a conventional quantity - generally speaking from 0.1 to 1% by weight calculated on monomer weight.

By a vinyl chloride polymer in this specification is meant either a homopolymer of vinyl chloride or a copolymer of vinyl chloride with one or more comonomers copolymerisable therewith. Examples of the latter include vinyl esters such as vinyl acetate, acrylic esters such as methyl acrylate and butyl methacrylate, acrylic nitriles such as acrylonitrile and methacrylonitrile, unsaturated diesters such as diethyl maleate, allyl esters such as allyl acetate, alpha-olefins such as ethylene and propylene, and vinyl ethers. It is preferable to apply the vinyl chloride polymerisation process to the production of polymers containing at least 50% molar and more particularly at least 80% molar of units derived from vinyl chloride.

The operating conditions for the vinyl chloride polymerisation process may be those customarily used for vinyl chloride polymerisation, the polymerisation temperature generally being between 40 and 75° C. and the pressure generally being below 15 kg/cm$^2$.

The vinyl chloride polymer produced from the polymerisation reaction (admixed with the alkyl (meth-)acrylate copolymer, possibly with the advent of some graft bonding) is worked up in conventional matter, e.g. by slurry stripping to remove residual vinyl chloride monomer, filtering or centrifuging to remove the bulk of the aqueous phase, and drying.

The vinyl chloride polymer composition of the present invention optionally includes at least one vinyl chloride polymer processing aid. This processing aid may be one conventionally incorporated in vinyl chloride polymer formulations, and examples thereof include commercially available materials. Generally speaking these materials are based on either styrene copolymers (e.g. styrene/acrylonitrile copolymers) or acrylic homo and copolymers. We prefer to use the latter type and such acrylic processing aids are usually based on methyl methacrylate polymers of very high molecular weight corresponding to a reduced viscosity R.V. (as measured on a 1% solution in chloroform at 25° C.) of at least 2, preferably 2 to 25, and more preferably 3 to 20. The most widely used materials are polymethyl methacrylate itself or copolymers of methyl (meth)acrylate with a minor amount (e.g. up to 25% molar, more usually 5 to 15% molar and typically about 10% molar) of one or more alkyl acrylates with 1 to 10 carbon atoms (more usually 1 to 4 carbon atoms) in the alkyl group such as ethyl acrylate. Commercially available acrylic processing aids are:

"Paraloid" K 120N (Rohm and Haas) with R.V. of about 2.1 (corresponding to a weight average molecular weight of about $1 \times 10^6$), "Diakon" APA1 (ICI) with R.V. of about 6.3 (corresponding to a weight average molecular weight of about $1.5 \times 10^6$), "Diakon" APA3 (ICI) with R.V. of about 18 (corresponding to a weight average molecular weight of greater than $20 \times 10^6$), and "Diakon" APA5 (ICI) with R.V. of about 12.5 (corresponding to a weight average molecular weight of about $3 \times 10^6$).

We find "Diakon" APA5 to be very effective.

The processing aid, if used, is usually present at a level of about 0.1 to 10 % by weight, based on the weight of vinyl chloride polymer in the composition, preferably about 0.1 to 5% by weight, and more preferably about 0.5 to 3% by weight; the best amount to use can be found by simple experimentation. The processing aid may be incorporated into the vinyl chloride polymer composition in any suitable manner. For example it may be added to the vinyl chloride polymerisation reaction mixture before or at the start of the polymerisation process or towards the end of the process (e.g. during the pressure drop period) or at any intermediate point. It may also be incorporated at any convenient stage after polymerisation, e.g. during the stripping or drying stages, or more preferably when preparing a formulation for fabrication processes such as calendering (e.g. by powder mixing or by compounding). The processing aid may be incorporated in any form which is convenient for the stage at which the incorporation is effected, e.g. as a dry powder or an aqueous emulsion. Again, simple experimentation may be used to determine the most effective or convenient stage and form for the incorporation.

The presence of the processing aid may particularly enhance the melt strength (and hence allows good melt extensibility, a feature which can prevent breakage of the film during calendering if the calendering process momentarily goes wrong) and gelation properties of the composition, and can sometimes also further improve non-stick behaviour.

Other conventional additives such as stabilisers, waxes, lubricants, fillers, anti-static agents, pigments, impact improvers, plasticisers (in small amount) may be included in or added to the compositions of the invention. For example, a composition according to the invention may be formulated in a suitable calendering formulation which includes additives such as impact modifier(s), wax(es), lubricant(s), and stabiliser(s).

The compositions of the invention may be processed by conventional thermoplastic fabrication processes, and in particular (suitably formulated) by calendering for the production of films, wherein the compositions exhibit excellent gelation, non-stick behaviour, melt strength, transparency, thermal stability and solvent resistance.

The present invention is illustrated by the following examples. The prefix C before an example number indicates a comparative example. Unless otherwise specified all parts and percentages are on a weight basis.

EXAMPLE 1

A vinyl chloride polymer composition according to the invention was prepared as follows.

An n-butyl acrylate/alpha methyl styrene copolymer was prepared by polymerising, in a bulk phase reaction, 100 parts of n-butyl acrylate in the presence of 13 parts of alpha methyl styrene and 10 parts of cyclohexene (as chain transfer agent), using a mixture of 0.20 parts azobisisobutyronitrile and 0.27 parts di-tert-butyl peroxide as initiator. The polymerisation reaction was started by heating 10% of the complete charge to 130°-140° C. and adding the remainder to the polymerisation medium, maintained at this same temperature, over a period of 4 hours. After maintaining the reaction medium at 130°-140° C. for a further period of 5 hours, the remaining volatile constituents were distilled off under reduced pressure, with a purge of nitrogen being passed through the polymeric product. During the distillation process the temperature of the product rose to as high as 200° C.;, and distillation was continued until the total level of volatile constituents in the product was less than 200 parts per million. The copolymer product, which was in the form of a fairly mobile syrup, had a weight average molecular weight of 56,000.

100 parts of vinyl chloride were polymerised at 66° C. in a pressure autoclave (equipped with a stirrer) in the presence of 200 parts water, 0.1 parts lauroyl peroxide/0.03 parts dicetylperoxydicarbonate (initiator system), 0.08 parts partially hydrolysed polyvinyl acetates/0.1 sorbitan monolaurate (suspension agent system), and 2 parts of the above-described n-butyl acrylate/alpha methyl styrene copolymer (added before the commencement of polymerisation). The resulting vinyl chloride polymer-based composition consisted (after stripping, dewatering and drying) of fine granules and was readily processible on calendering equipment.

EXAMPLES C2, C3, AND C4

Vinyl chloride polymer compositions C2, C3, and C4 were prepared substantially as per the procedure for making the vinyl chloride composition of Example 1 except that in place of the alpha methyl styrene comonomer in the n-butyl acrylate polymerisation there was used repectively styrene (Example C2), methyl methacrylate (Example C2), and nothing (Example C3, i.e. homopolymer being prepared). The differing details of the n-butyl acrylate polymerisations are given in the following Table 1.

TABLE 1

| Ex. No. | Comonomer used and amount (parts) | Amount cyclohexene used (parts) | Mol. Wt. of n-butyl acrylate polymer product |
|---|---|---|---|
| C2 | styrene 15 | 10 | 59,000 |
| C3 | methyl methacrylate 15 | 10 | 56,000 |
| C4 | none — | 7.5 | 52,000 |

As in the preparation of the composition of Example 1, the above n-butyl acrylate polymers were used at a level of 2 parts in the subsequent vinyl chloride polymerisations, the polymerisations being otherwise as per Example 1. The resulting vinyl chloride polymer compositions C2, C3 and C4 consisted, like that of Example 1, of fine granules which could be readily processed on calendering equipment.

EXAMPLES 5, 6, C7, C8, C9, C10, C11

Calendering runs were performed in these examples, Examples 5 and 6 using the composition of Example 1, Example C7 using the composition of Example C2, Example C8 using the composition of Example C3, and Example C9 using the composition of Example C4. Examples C10 and C11 employed (for further comparison) a vinyl chloride polymer prepared as per Example 1 but containing no n-butyl acrylate polymer. Each material (100 parts) was blended before calendering with 9 parts of a proprietary calendering formulation comprising 7 parts impact modifier, 1 part tin stabiliser, and 1 part (in total) waxes/lubricants. In Examples 6, C7, C8, C9 and C11 only, 1 part of "Diakon" APA 5 processing aid was also included as part of the vinyl chloride polymer composition.

Calendering was performed to produce clear foils of about 200 microns thickness using production speeds of 20 m/min and 40 m/min.

The haze levels of the resulting foils were determined according to ASTM D1003-59T by means of pressing a part of the mill hide to give 1 mm thick sheets. The non-stick calendering characteristics of the formulations were assessed from the tendency of the mixtures to stick to the calender bowls (in the following Table 2, non-stick behaviour is indicated by + and unacceptable sticking behaviour by —). All the foils found were found to have good thermal stability and good solvent resistance.

The results of the calendering runs are summarized in Table 2. The advantage and utility of the present invention is readily apparent from these results.

TABLE 2

| Ex No | Source of vinyl chloride polymer composition | Comonomer in n-butyl acrylate polymer | Amount "Diakon" APA5 in formulation (parts) | Haze ASTM D1003-59T | Non-stick behavior 20 m/min production speed | Non-stick behavior 40 m/min production speed |
|---|---|---|---|---|---|---|
| 5 | Ex 1 | alpha methyl styrene | 0 | 2.7 | + | — |
| 6 | Ex 1 | alpha methyl styrene | 1 | 2.6 | + | + |
| C7 | Ex C2 | styrene | 1 | 5.4 | + | + |
| C8 | Ex C3 | methyl methacrylate | 1 | 7.1 | + | + |
| C9 | Ex C4 | no comonomer used | 1 | 5.6 | + | — |
| C10 | — | no polymer used | 0 | 2.5 | — | — |
| C11 | — | no polymer used | 1 | 2.4 | — | — |

EXAMPLE C12

Several attempts were made to produce vinyl chloride compositions as per Example 1 but using n-butyl acrylate/alpha methyl styrene copolymers of weight average molecular weight above 100,000. However extremely coarse pebble-like products were obtained from the vinyl chloride polymerisations which were unsuitable for calendering operations.

We claim:

1. A vinyl chloride polymer composition comprising a mixture of a vinyl chloride polymer and at least one alkyl (meth)acrylate copolymer, wherein the admixture of said vinyl chloride polymer and said at least one alkyl (meth)acrylate copolymer has been effected by polymerisation in aqueous suspension of the monomer(s) to form said vinyl chloride polymer in the presence of 0.1 to 20 weight % (based on the weight of monomer(s) used for the vinyl chloride polymerisation) of said at least one alkyl (meth)acrylate copolymer, and wherein said alkyl (meth)acrylate copolymer is a copolymer formed from the copolymerisation by a bulk phase process of at least one alkyl (meth)acrylate of 2 to 8 carbon atoms in the alkyl group with 1 to 50% by weight (based on the weight of alkyl (meth)acrylate charged) of alpha methyl styrene and 0 to 30 % by weight (based on the weight of alkyl (meth)-acrylate charged) of one or more other copolymerisable monomers, and has a weight average molecular weight within the range of from 10,000 to 100,000.

2. A composition according to claim 1 wherein said alkyl (meth)acrylate copolymer is a copolymer of n-butyl acrylate and alpha methyl styrene.

3. A composition according to claim 1 wherein the amount of alpha methyl styrene employed for making said alkyl (meth)acrylate copolymer is from 5 to 40% by weight based on the weight of alkyl (meth) acrylate employed in the copolymerisation.

4. A composition according to claim 1 wherein the molecular weight of said alkyl (meth)acrylate copolymer is within the range of from 25,000 to 75,000.

5. A composition according to claim 1 wherein said alkyl (meth)acrylate copolymer in the composition has been prepared by a copolymerisation process conducted in the presence of cyclohexene as chain transfer agent.

6. A composition according to claim 5 wherein the amount of cyclohexene used is 1 to 20 weight % based on the weight of alkyl (meth)acrylate employed in the copolymerisation.

7. A composition according to claim 1 wherein said alkyl (meth)acrylate copolymer in the composition is a copolymer of n-butyl acrylate and alpha methyl styrene prepared by copolymerising, in a bulk phase process using a reaction temperature of 130° to 140° C., n-butyl acrylate and 10 to 20 weight % of alpha methyl styrene based on the weight of n-butyl acrylate employed in the copolymerisation and 10 to 15 weight % of cyclohexene based on the weight of n-butyl acrylate employed in the copolymerisation.

8. A composition according to claim 1 wherein the amount of alkyl (meth)acrylate copolymer in the composition is that resulting from the use of 0.1 to 5 weight % of said alkyl (meth)acrylate copolymer in the vinyl chloride polymerisation process, based on the weight of monomer(s) charged for this polymerisation.

9. A composition according to claim 1 wherein the vinyl chloride polymer therein has been prepared by a polymerisation process in which said alkyl (meth)acrylate is present at or before the start of polymerisation.

10. A composition according to claim 1 which includes at least one vinyl chloride polymer processing aid.

11. A composition according to claim 10 wherein the amount of processing aid used is 0.1 to 5% by weight based on the weight of vinyl chloride polymer in the composition.

12. Process for the production of a vinyl chloride polymer composition comprising forming a mixture of a vinyl chloride polymer and at least one alkyl (meth)acrylate copolymer, wherein in said process the admixture of said vinyl chloride polymer and said at least one alkyl (meth)acrylate copolymer is effected by polymerisation in aqueous suspension of the monomer(s) to form said vinyl chloride polymer in the presence of 0.1 to 20 weight % (based on the weight of monomer(s) used for the vinyl chloride polymerisation) of said at least one alkyl (meth)acrylate copolymer, and wherein said alkyl (meth)acrylate copolymer is a copolymer formed from the copolymerisation by a bulk phase process of at least one alkyl (meth)acrylate of 2 to 8 carbon atoms in the alkyl group with 1 to 50% by weight (based on the weight of alkyl (meth)acrylate charged) of alpha methyl styrene and 0 to 30% by weight (based on the weight of alkyl (meth)acrylate charged) of one or more other copolymerisable monomers, and has a weight average molecular weight within the range of from 10,000 to 100,000.

13. Process according to claim 12 wherein said alkyl (meth)acrylate copolymer used in the process is a copolymer of n-butyl acrylate and alpha methyl styrene.

14. Process according to claim 12 wherein the amount of alpha methyl styrene employed for making said alkyl (meth)acrylate copolymer is from 5 to 40% by weight based on the weight of alkyl (meth)acrylate employed in the copolymerisation.

15. A composition according to claim 12 wherein the weight average molecular weight of said alkyl (meth)acrylate copolymer used in the process is within the range of from 25,000 to 75,000.

16. A composition according to claim 12 wherein said alkyl (meth)acrylate copolymer used in the process has been prepared by a copolymerisation process conducted in the presence of cyclohexene as chain transfer agent.

17. Process according to claim 16 wherein the amount of cyclohexene used is 1 to 20 weight % based on the weight of alkyl (meth)acrylate employed in the copolymerisation.

18. Process according to claim 12 wherein said alkyl (meth)acrylate copolymer in the composition is a copolymer of n-butyl acrylate and alpha methyl styrene prepared by copolymerising, in a bulk phase process using a reaction temperature of 130° to 140° C., n-butyl acrylate and 10 to 20 weight % of alpha methyl styrene based on the weight of n-butyl acrylate employed in the copolymerisation and 10 to 15 weight % of cyclohexene based on the weight of n-butyl acrylate employed in the copolymerisation.

19. Process according to claim 12 wherein the amount of alkyl (meth)acrylate copolymer used in the composition is that resulting from the use of 0.1 to 5 weight % of said alkyl (meth)acrylate copolymer in the vinyl chloride polymerisation process, based on the weight of monomer(s) charged for this polymerisation.

20. Process according to claim 12 wherein the vinyl chloride polymer used therein has been prepared by a polymerisation process in which said alkyl (meth)acrylate copolymer is present at or before the start of polymerisation.

21. Process according to claim 12 wherein at least one vinyl chloride polymer processing aid is admixed with said vinyl chloride polymer and said at least one alkyl (meth)acrylate copolymer.

22. Process according to claim 21 wherein the amount of processing aid used is 0.1 to 5% by weight based on the weight of vinyl chloride polymer used.

23. A calendering formulation which is or includes a composition according to claim 1.

24. Calendered foil produced from a composition according to claim 1.

25. In a method of calendaring a vinyl chloride polymer composition to produce transparent film, the improvement which comprises using, as the composition, the composition of claim 1.

* * * * *